United States Patent
Reiser et al.

(10) Patent No.: US 6,858,336 B2
(45) Date of Patent: Feb. 22, 2005

(54) PROCEDURE FOR SHUTTING DOWN A FUEL CELL SYSTEM USING AIR PURGE

(75) Inventors: Carl A. Reiser, Stonington, CT (US); Deliang Yang, Torrance, CA (US); Richard D. Sawyer, Groveton, NH (US)

(73) Assignee: UTC Fuel Cells, LLC, S. Windsor, CT (US)

(*) Notice: Subject to any disclaimer, the term of this patent is extended or adjusted under 35 U.S.C. 154(b) by 123 days.

(21) Appl. No.: 10/305,300

(22) Filed: Nov. 26, 2002

(65) Prior Publication Data

US 2003/0134164 A1 Jul. 17, 2003

Related U.S. Application Data

(63) Continuation-in-part of application No. 09/742,497, filed on Dec. 20, 2000, now abandoned.

(51) Int. Cl.[7] ............................................. H01M 8/00
(52) U.S. Cl. .......................... 429/13; 429/12; 429/22; 429/30
(58) Field of Search ........................... 429/12, 13, 22, 429/30

(56) References Cited

U.S. PATENT DOCUMENTS

| | | | |
|---|---|---|---|
| 4,115,627 A | 9/1978 | Christner et al. | 429/44 |
| 4,839,247 A | 6/1989 | Levy et al. | 429/21 |
| 5,013,617 A | 5/1991 | Scheffler | 429/17 |
| 5,045,414 A | 9/1991 | Bushnell et al. | 429/17 |
| 5,503,944 A | 4/1996 | Meyer et al. | 429/13 |
| 6,025,083 A | 2/2000 | Veyo et al. | 429/13 |
| 6,159,626 A * | 12/2000 | Keskula et al. | 429/22 |
| 6,376,113 B1 | 4/2002 | Edlund et al. | 429/17 |
| 6,379,827 B1 * | 4/2002 | Cipollini | 429/13 |
| 6,399,231 B1 * | 6/2002 | Donahue et al. | 429/13 |
| 6,432,566 B1 * | 8/2002 | Condit et al. | 429/17 |

* cited by examiner

*Primary Examiner*—Dah-Wei Yuan

(57) ABSTRACT

A procedure for shutting down an operating fuel cell system includes disconnecting the primary electricity using device and stopping the flow of hydrogen containing fuel to the anode, followed by quickly displacing the residual hydrogen with air by blowing air through the anode fuel flow field. A sufficiently fast purging of the anode flow field with air eliminates the need for purging with an inert gas such as nitrogen.

32 Claims, 3 Drawing Sheets

PROCEDURE FOR SHUTTING DOWN A FUEL CELL SYSTEM USING AIR PURGE

This application is a continuation-in-part of U.S. Ser. No. 09/742,497 filed on Dec. 20, 2000 now abandoned.

BACKGROUND OF THE INVENTION

1. Technical Field

This invention relates to fuel cell systems and, more particularly, to procedures for shutting down an operating fuel cell.

2. Background Information

It is well known in the fuel cell art that, when the electrical circuit is opened and there is no longer a load across the cell, such as upon and during shut-down of the cell, the presence of air on the cathode, coupled with hydrogen fuel remaining on the anode, often cause unacceptable anode and cathode potentials, resulting in catalyst and catalyst support oxidation and corrosion and attendant cell performance degradation. It was thought that inert gas needed to be used to purge both the anode flow field and the cathode flow field immediately upon cell shut-down to passivate the anode and cathode so as to minimize or prevent such cell performance degradation. Further, the use of an inert gas purge avoided the possible occurrence of a flammable mixture of hydrogen and air, which is a safety issue. While the use of 100% inert gas as the purge gas is most common in the prior art, commonly owned U. S. Pat. Nos. 5,013,617 and 5,045,414 describe using 100% nitrogen as the anode side purge gas, and a cathode side purging mixture comprising a very small percentage of oxygen (e.g. less than 1%) with a balance of nitrogen. Both of these patents also discuss the option of connecting a dummy electrical load across the cell during the start of purge to lower the cathode potential rapidly to between the acceptable limits of 0.3–0.7 volt.

It is undesirable to use nitrogen or other inert gas as a shut-down or start-up purge gas for fuel cells where compactness and service interval of the fuel cell powerplant is important, such as for automotive applications. Additionally, it is desired to avoid the costs associated with storing and delivering inert gas to the cells. Therefore, safe, cost effective shut-down and start-up procedures are needed that do not cause significant performance degradation and do not require the use of inert gases, or any other gases not otherwise required for normal fuel cell operation.

BRIEF SUMMARY OF THE INVENTION

In accordance with the present invention, a procedure for shutting down an operating fuel cell system includes disconnecting the primary electricity using device and stopping the flow of hydrogen containing fuel to the anode, followed by displacing the fuel remaining in the anode fuel flow field with air by blowing air through the anode fuel flow field.

In one experiment using a stack of PEM fuel cells of the general type described in commonly owned U. S. Pat. No. 5,503,944, the primary electricity using device was disconnected, and the flow of fuel (hydrogen) to the anode and the flow of air to the cathode were shut off. No attempt was made to purge the anode flow field of residual fuel or to purge the cathode flow field of air, such as by using an inert gas purge. To restart the cell, fuel and oxidant were flowed directly into their respective flow fields. (The foregoing procedure is hereinafter referred to as an "uncontrolled" start/stop cycle.) It was found that a cell stack assembly operated in this manner experienced rapid performance decay which had not previously been observed. (This is further discussed hereinafter in connection with curve "J" of FIG. 3.) Further, it was discovered that a large number of start/stop cycles were more detrimental to cell performance than were a large number of normal operating hours under load. It was eventually determined, through experimentation, that both the shut-down and start-up procedures were contributing to the rapid performance decay being experienced by the cell; and it was known that such rapid decay did not occur when, in accordance with prior art techniques, inert gas was used to passivate the cell at each shut down. Examination of used cells that experienced only a few dozen uncontrolled start/stop cycles showed that 25% to 50% of the high surface area carbon black cathode catalyst support was corroded away, which had not previously been reported in the prior art.

Further testing and analysis of results led to the belief that the following mechanism caused the performance decay experienced in the foregoing experiment: With reference to FIG. 2, a diagrammatic depiction of a PEM fuel cell is shown. (Note that the mechanism to be described is also applicable to cells using other electrolytes, such as phosphoric acid or potassium hydroxide with appropriate changes in ion fluxes.) In FIG. 2, M represents a proton exchange membrane (PEM) having a cathode catalyst layer C on one side and an anode catalyst layer A on the other side. The cathode air flow field carrying air to the cathode catalyst is divided into air zones 1 and 2 by a dotted line. The anode fuel flow field that normally carries hydrogen over the anode catalyst from an inlet I to an exit E is also divided into two zones by the same dotted line. The zone to the left of the dotted line and adjacent the inlet I is filled with hydrogen and labeled with the symbol $H_2$. The zone to the right of the dotted line and adjacent the exit E is zone 3 and is filled with air.

Upon an uncontrolled shut-down (i.e. a shut-down without taking any special steps to limit performance decay) some of the residual hydrogen and some of the oxygen in their respective anode and cathode flow fields diffuse across the PEM (each to the opposite side of the cell) and react on the catalyst (with either oxygen or hydrogen, as the case may be) to form water. The consumption of hydrogen on the anode lowers the pressure in the anode flow field to below ambient pressure, resulting in external air being drawn into the anode flow field at exit E creating a hydrogen/air front (the dotted line in FIG. 2) that moves slowly through the anode flow field from the fuel exit E to the fuel inlet I. Eventually the anode flow field (and the cathode flow field) fills entirely with air. Upon start-up of the cell, a flow of air is directed into and through the cathode flow field and a flow of hydrogen is introduced into the anode flow field inlet I. On the anode side of the cell this results in the creation of a hydrogen/air front (which is also represented by the dotted line in FIG. 2) that moves across the anode through the anode flow field, displacing the air in front of it, which is pushed out of the cell. In either case, (i.e. upon shut-down and upon start-up) a hydrogen/air front moves through the cell. On one side of the moving front (in the zone $H_2$ in FIG. 2) the anode is exposed substantially only to fuel (i.e. hydrogen); and in zone 1 of the cathode flow field, opposite zone $H_2$, the cathode is exposed only to air. That region of the cell is hereinafter referred to as the $H_2$/air region: i.e. hydrogen on the anode and air on the cathode. On the other side of the moving front the anode is exposed essentially only to air; and zone 2 of the cathode flow field, opposite zone 3, is also exposed to air. That region of the cell is hereinafter referred to as the air/air region: i.e. air on both the anode and cathode.

The presence of both hydrogen and air within the anode flow field results in a shorted cell between the portion of the anode that sees hydrogen and the portion of the anode that sees air. This results in small in-plane flow of protons ($H^+$) within the membrane M and a more significant through-plane flow of protons across the membrane, in the direction of the arrows labeled $H^+$, as well as an in-plane flow of electrons ($e^-$) on each side of the cell, as depicted by the arrows so labeled. The electrons travel through the conductive catalyst layers and other conductive cell elements that may contact the catalyst layer. On the anode side the electrons travel from the portion of the anode that sees hydrogen to the portion that sees air; and on the cathode side they travel in the opposite direction.

The flow of electrons from the portion of the anode that sees hydrogen to the portion of the anode that sees air results in a small change in the potential of the electron conductor. On the other hand, electrolytes in the membrane are relatively poor in-plane proton conductors, and the flow of protons results in a very significant drop in the electrolyte potential between zones $H_2$ and 3.

It is estimated that the reduction in electrolyte potential between zones $H_2$ and 3 is on the order of the typical cell open circuit voltage of about 0.9–1.0 volts. This drop in potential results in a proton flow across the PEM, M, from the cathode side, zone 2, to the anode side, zone 3, which is the reverse direction from what occurs under normal cell operating conditions. It is also estimated that the reduction in electrolyte potential in the portion of the anode that sees air (in zone 3) results in a cathode potential in zone 2 of approximately 1.5 to 1.8 volts, versus the normal cathode potential of 0.9 to 1.0 volts. (Note: These potentials are relative to the hydrogen potential at the same operating conditions.) This elevated cathode potential results in rapid corrosion of the carbon support material and the cathode catalyst, causing significant cell performance decay.

One object of the present invention is to minimize any fuel cell catalyst and catalyst support corrosion occurring during shut-down of the fuel cell, and to do it without purging air from the cells with inert gas upon shut-down.

In accordance with one embodiment of the present invention, a shut-down procedure includes the steps of disconnecting the primary load from the cell; halting the flow of fuel to the anode and the flow of air to the cathode; and then blowing air under pressure into and through the anode flow field to rapidly displace all the hydrogen remaining in the anode flow field. Displacing the hydrogen quickly reduces the period of time that platinum and carbon corrosion occurs, as compared with simply allowing the air to be drawn slowly into the cell as a result of falling hydrogen pressure over an extended period of time, which may be as long as 30 to 60 seconds or more. Although dependent upon the cell materials, desired length of cell life, and the number of shut-downs and start-ups likely to occur during that life, it is believed the hydrogen/air front will need to move through the anode in no more than about 1.0 second to satisfy performance needs over the life of the cell without requiring an inert gas purge. Preferably the purge air flow rate will move the $H_2$/air front (and thus all the hydrogen) through and out of the anode flow field in less than 0.2 seconds. For long life applications, such as automotive applications, with frequent start-ups and shut-downs, a purge time of 0.05 seconds or less is most preferable.

In a preferred embodiment of the invention, after the primary load is disconnected and the fuel and oxidant flow to the cell is stopped, a small auxiliary resistive load is connected across the cell for a period of time immediately prior to blowing air through the anode flow field. The application of the auxiliary load prior to the purging step consumes hydrogen in the anode flow field through the occurrence of normal electrochemical reactions. Then, when the step of blowing air through the anode flow field commences, the cathode potential will have been significantly lowered, and, consequently, the rate of catalyst and catalyst support corrosion during the air purge will be lower. Note that, in this embodiment, the auxiliary load may be disconnected prior to commencing the air purge, or it may be continued during at least a portion of or throughout the air purge.

In the preceding preferred embodiment the auxiliary load is connected after stopping both the fuel and oxidant flow to the cell. This reduces the cathode potential by consuming all the residual oxygen in the cathode flow field and a significant amount of the residual hydrogen in the anode flow field. Alternatively, the auxiliary load is connected after the oxidant flow has been stopped, but prior to stopping the fuel flow. The fuel flow is stopped at any time prior to commencing the air purge. The auxiliary load remains connected at least until the residual oxygen on the cathode has been consumed. The fuel flow is turned off at any time prior to commencing the air purge. Both the preferred and alternate embodiments reduce the cathode potential prior to the air purge. The preferred embodiment, however, assures the maximum possible reduction.

The following commonly owned U. S. non-provisional patent application describes and claims an invention related to the subject matter of this application: U.S. Ser. No. 09/742,481 "Procedure for Starting Up a Fuel Cell System Using a Fuel Purge", invented by Carl Reiser, Richard Sawyer, and Deliang Yang; U.S. Ser. No. 09/770,042 filed on Jan. 25, 2001 "Procedure for Shutting Down a Fuel Cell System Having an Anode Exhaust Recycle Loop", invented by Carl Reiser, Leslie Van Dine, Glenn Scheffler, and Margaret Steinbugler; and, U.S. Ser. No. 10/189,696 filed on Jul. 3, 2002 "Procedure for Starting Up a Fuel Cell System Having an Anode Exhaust Recycle Loop", invented by Carl Reiser, Leslie Van Dine, Richard Sawyer, Deliang Yang, and Margaret Steinbugler.

The foregoing features and advantages of the present invention will become more apparent in light of the following detailed description of exemplary embodiments thereof as illustrated in the accompanying drawings.

DETAILED DESCRIPTION OF THE INVENTION

Figure 1:
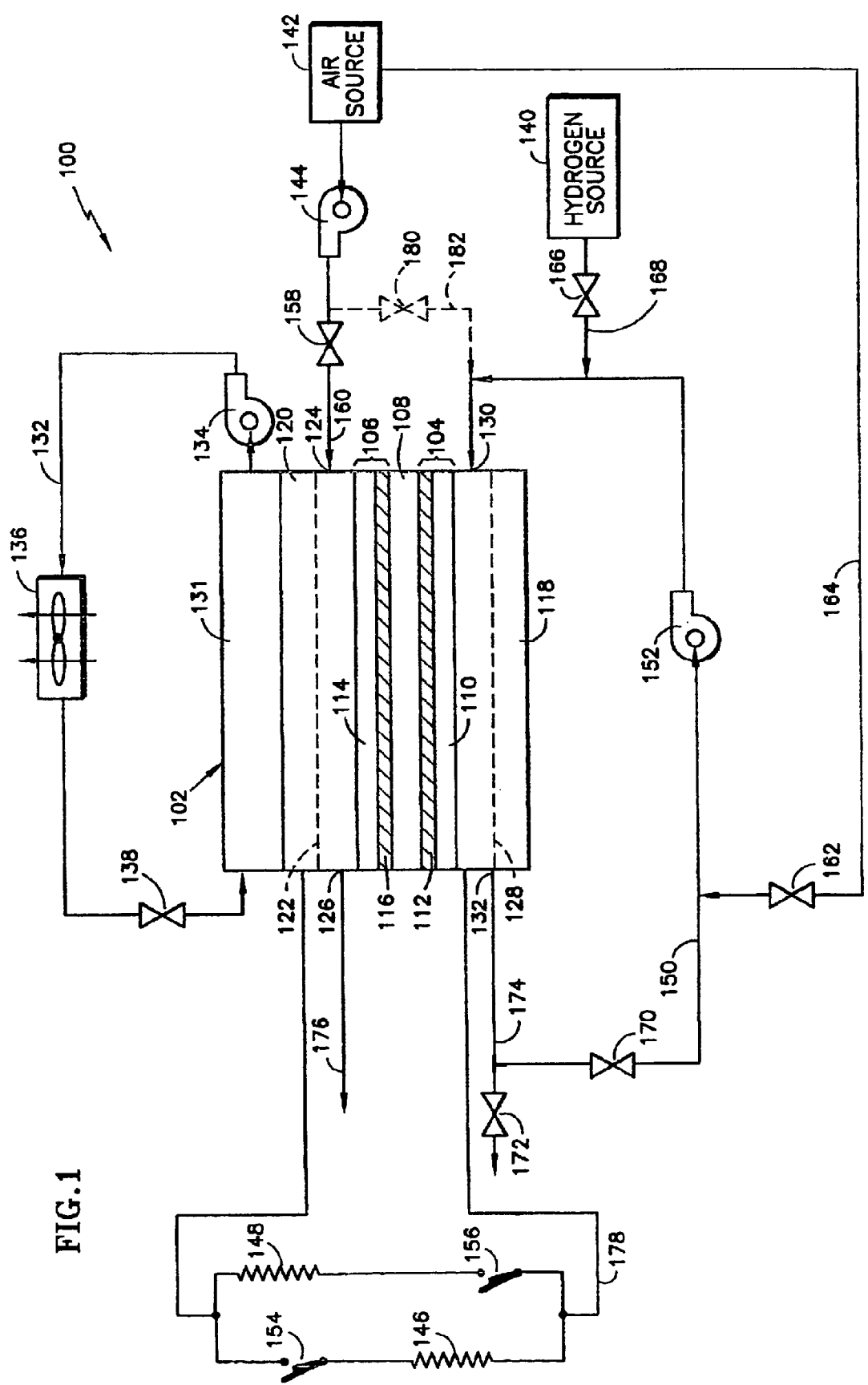
FIG. 1 is a schematic depiction of a fuel cell system that may be operated in accordance with the shut-down procedures of the present invention.
Figure 2:
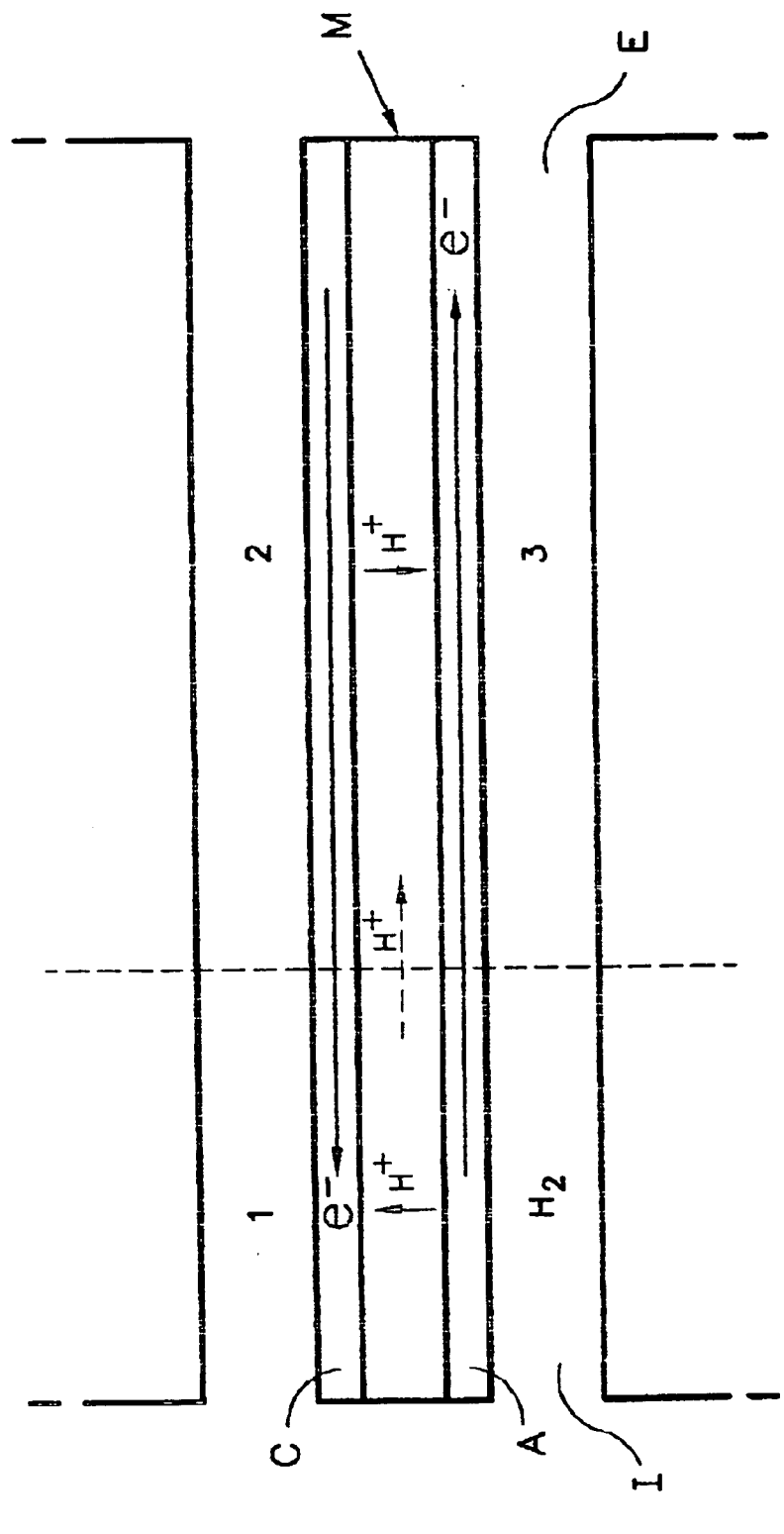
FIG. 2 is a diagrammatic view of a fuel cell cross-section used to explain a mechanism that may cause cell performance degradation during start-up and shut-down.

In FIG. 1, a fuel cell system 100 is shown. The system includes a fuel cell 102 comprising an anode 104, a cathode 106, and an electrolyte layer 108 disposed between the anode and cathode. The anode includes an anode substrate 110 having an anode catalyst layer 112 disposed thereon on the side of the substrate facing the electrolyte layer 108. The cathode includes a cathode substrate 114, having a cathode catalyst layer 116 disposed thereon on the side of the substrate facing the electrolyte layer 108. The cell also includes an anode flow field plate 118 adjacent the anode substrate 110, and a cathode flow field plate 120 adjacent the cathode substrate 114.

The cathode flow field plate 120 has a plurality of channels 122 extending thereacross adjacent the cathode substrate forming a cathode flow field for carrying an oxidant, preferably air, across the cathode from an inlet 124 to an outlet 126. The anode flow field plate 118 has a plurality of channels 128 extending thereacross adjacent the anode substrate forming an anode flow field for carrying a hydrogen containing fuel across the anode from an inlet 130 to an outlet 132. Each cell also includes a cooler 131 adjacent the cathode flow field plate 120 for removing heat from the cell, such as by using a water pump 134 to circulate water through a loop 132 that passes through the cooler 131, a radiator 136 for rejecting the heat, and a flow control valve or orifice 138.

Although only a single cell 120 is shown, in actuality a fuel cell system would comprise a plurality of adjacent cells (i.e. a stack of cells) connected electrically in series, each having a cooler separating the cathode flow field plate of one cell from an anode flow field plate of the adjacent cell. For more detailed information regarding fuel cells like the one represented in FIG. 1, the reader is directed to commonly owned U.S. Pat. Nos. 5,503,944 and 4,115,627, both of which are incorporated herein by reference. The '944 patent describes a solid polymer electrolyte fuel cell wherein the electrolyte layer is a proton exchange membrane (PEM). The '627 patent describes a phosphoric acid electrolyte fuel cell wherein the electrolyte is a liquid retained within a porous silicon carbide matrix layer.

Normal Operation

Referring, again, to FIG. 1, the fuel cell system includes a source 140 of fresh hydrogen containing fuel, under pressure, a source 142 of air, an air blower 144, a primary electricity using device or primary load 146, an auxiliary load 148, an anode exhaust recycle loop 150, and a recycle loop blower 152. (By "fresh" hydrogen containing fuel, it is meant fuel that has not yet been introduced into the fuel cell, as opposed to fuel that has been partially consumed within the cell and recirculated through the cell.) During normal fuel cell operation, when the cell is providing electricity to the primary load 146, a primary load switch 154 is closed (it is shown open in the drawing), and an auxiliary load switch 156 is open. The air blower 144, anode exhaust recycle blower 152 and coolant pump 134 are all on, and a valve 166 in a fuel feed conduit from the fuel source 140 into the anode recycle loop 150 downstream of the recycle blower 152 is open, as is the valve 170 in the recycle loop 150 and the anode exhaust vent valve 172 in an anode exhaust conduit 174. An air inlet feed valve 158 in the conduit 160 is open. An air feed valve 162 in a conduit 164 from the air source 142 to a point in the recycle loop upstream of the recycle blower 152 is closed.

Thus, during normal operation, air from the source 142 is continuously delivered into the cathode flow field inlet 124 via the conduit 160 and leaves the cell outlet 126 via a conduit 176. Fresh hydrogen containing fuel from the pressurized source 140 is continuously delivered into the anode flow field via the conduit 168, which directs the fuel into the recycle loop 150. A portion of the anode exhaust, containing depleted fuel leaves the anode flow field through the vent valve 172 via the conduit 174, while the recycle blower 152 recirculates the balance of the anode exhaust through the anode flow field via the recycle loop in a manner well know in the prior art. The recycle flow helps maintain a relatively uniform gas composition from the inlet 130 to the outlet 132 of the anode flow field, as well as returning some water vapor to the cell to prevent dry-out of the cell in the vicinity of the fuel inlet. The hydrogen in the fuel electrochemically reacts in a well-known manner during normal cell operation to produce protons (hydrogen ions) and electrons. The electrons flow from the anode 104 to the cathode 106 through an external circuit 178 to power the load 146, while the protons flow from the anode 104 to the cathode 106 through the electrolyte 108.

Shut-down Procedure

In accordance with an exemplary embodiment of the present invention, to avoid significant cell performance decay as a result of corrosion of the cell catalyst and catalyst support the following procedure may be used to shut down the cell: The switch 154 is opened, disconnecting the primary load from the external circuit. The valve 166 is closed to stop the flow of fuel to the anode flow field. The air inlet feed valve 158 is preferably closed, as well as the anode vent valve. (The valve 158 could be left open, allowing air flow through the cathode, if desired.) The recycle flow valve 170 may remain open and the recycle blower 152 may remain on in order to continue to recirculate the anode exhaust through the cell. This prevents localized fuel starvation on the anode. The switch 156 is then closed, thereby connecting the small auxiliary resistive load 148 across the cell in the external circuit 178. With the switch 156 closed, the usual cell electrochemical reactions continue to occur such that the hydrogen concentration in the anode flow field is reduced.

The valve 162 (or other valve that may provide a source of ambient air into the recycle loop 150, such as the valve 180 in the conduit 182, shown in phantom for use in connection with another embodiment hereinafter described) may be partially opened during the period of auxiliary load application to prevent the pressure in the anode chamber from dropping below ambient pressure, and to prevent random air leaks into the anode flow field. The oxygen in the air also hastens the consumption of hydrogen by reacting with the hydrogen on the anode catalyst.

The auxiliary load 148 is preferably sized to lower the cell voltage from its open circuit voltage of about 0.90–1.0 volts per cell to about 0.20 volts per cell in about 15 seconds to one minute. The size of the load necessary to accomplish this will depend upon the particulars of the cell design, such as number of cells, size of cells, and the maximum volume of hydrogen within the anode flow field and any fuel manifolds or the like. Note that the first 0.10 volt drop in cell voltage (from, for example, an initial voltage of 0.95 volts to a voltage of 0.85 volts) reduces the amount of hydrogen on anode side by more than two orders of magnitude (i.e. from 100% hydrogen to less than 1% hydrogen) for the case where the air valve 158 is open. Thus, even if the auxiliary load reduced the cell voltage by only 0.1 volt, this would be very beneficial to the shut-down process. During the period of low level current production resulting from application of the auxiliary load prior to the commencement of the air purge, no hydrogen/air front traverses the cell; and, as a result of the application of the auxiliary load, the magnitude of the "reverse currents" believed to cause cell performance decay during shut-down will be lower during the air purge step.

Diodes are well known devices that allow current to pass therethrough as long as the voltage thereacross is above a value determined by the design of the diode. Thus, a diode may be selected to pass current as long as the voltage across the diode is, for example, 0.2 volt per cell or greater. Such a diode may be inserted between and connected in series with the auxiliary load 148 and the switch 156. With the switch 156 closed (and the switch 154 open) current would flow only until the cell voltage dropped to 0.2 volt per cell. The diode thereby prevents any individual cell within a cell stack from being driven to a negative voltage, which is undesirable.

Once the cell voltage has been reduced by a predetermined amount (preferably by at least 0.1 volts, and most preferably to a voltage of 0.2 volts per cell or less, but not less than 0.0 volt for any individual cell), the switch 156 may be opened, or it may remain closed during all or part of the remainder of the shut-down procedure. The recycle valve 170 is closed to prevent further recirculation of the anode exhaust. The anode exhaust vent valve is opened, and the air flow valve 162 is then opened to allow air from the source 142 into the recycle loop immediately downstream of the valve 170 and just upstream of the recycle blower 152. The blower 152 blows this air directly into and through the channels 128 of the anode flow field, quickly displacing any fuel remaining therein. That fuel, with the air behind it, leaves the cell through the vent valve 172. The anode flow field is now filled entirely with air, and the blower 152 may be shut off.

Although in the foregoing embodiment an auxiliary load is used to reduce cell voltage before commencing with the step of displacing the hydrogen with air, for some applications, if the speed of the air purge is sufficiently fast and/or the number of on/off cycles required during the life of the cell is sufficiently small, unacceptable performance decay caused by shut-down procedures may be avoided without the step of applying an auxiliary load. In such an application the air purge would be initiated immediately upon disconnecting the primary load.

In the fuel cell system just described, the recycle blower 152 is used to blow purge air through the anode flow field to displace the hydrogen therein. If the fuel cell system did not have a recycle loop 150, the air blower 144 could perform the purging function of the recycle blower 152 during the shut-down procedure by connecting a conduit 180 (shown in phantom) from the conduit 160 directly into the anode flow field inlet. After the switch 156 and the vent valve 172 are opened, the valve 182 in a conduit 180, is opened. The blower 144 then blows purge air from the source 142, through the conduit 180, and directly into the fuel inlet 130 to create a front of air (herein usually referred to as a "hydrogen/air" front because hydrogen is on one side and air is on the other) that sweeps through the anode flow field. (Note that, as in other embodiments, the auxiliary load 148 may still be connected across the cell prior to purging to electrochemically consume a portion of and preferably most of hydrogen residing in the anode flow field.)

In some fuel cell systems the anode and cathode flow field plates and the cooler plate, such as the plates 118, 122 and 131, or the like are porous and used to both carry gasses to the cell anode and cathode and to transport water away from the cells. In those systems, the coolant loop pump, such as the pump 134, should remain on during the shut-down procedure of the present invention. This prevents reactant channels from becoming blocked by coolant draining from coolant channels. Blocked reactant channels may make the shut-down procedure of the present invention (as well as the analogous start-up procedure described below) ineffective by preventing reactant gasses from readily reaching portions of the anode and cathode catalysts. Once the cells are free of hydrogen, the coolant loop pump may be turned off.

Start-up Procedure

Assume, now, that the cell has been shut-down in accordance with the procedure of the present invention and has only air within the anode and cathode flow fields. To restart the fuel cell system 100, the coolant loop valve 138, if closed, is opened. The switch 156 remains open, as the auxiliary load is not used during start-up. The air flow valve 158 is preferably open, but it may be closed; and the blower 144 and pump 134 are turned on. The anode exhaust vent valve 172 is open and the air flow valve in the conduit 162 is closed. The recycle flow valve 170 is also closed, and the recycle blower is off. The fuel flow valve 166 is opened to allow a flow of pressurized hydrogen from the source 140 into the anode flow field. The hydrogen flow pushes the air out of the anode flow field. When substantially all the air has been displaced from the anode flow field, the switch 154 is closed to connect the primary load across the cell 102. (If the air flow valve was closed, it is opened prior to closing the switch 154.) The cell may now be operated normally.

During shut-down best results are achieved when fuel in the anode flow field is displaced with air as quickly as possible. Similarly, during start-up, it is preferred to displace the air within the anode flow field with fuel as quickly as possible. In either case the displacement should occur in less than about 1.0 seconds, and preferably less than 0.2 seconds. For long life applications with a high number of start-stop cycles, such as for automotive applications, it is most preferable to purge the fuel from the anode flow field at shut-down and to purge the air from the anode flow field at start-up in less than 0.05 seconds. Blowers and other devices used to move the gases through the system may easily be selected to achieve the desired speed with which the hydrogen/air front is to move through the cell and thus purge the cell of undesired gases.

Figure 3:
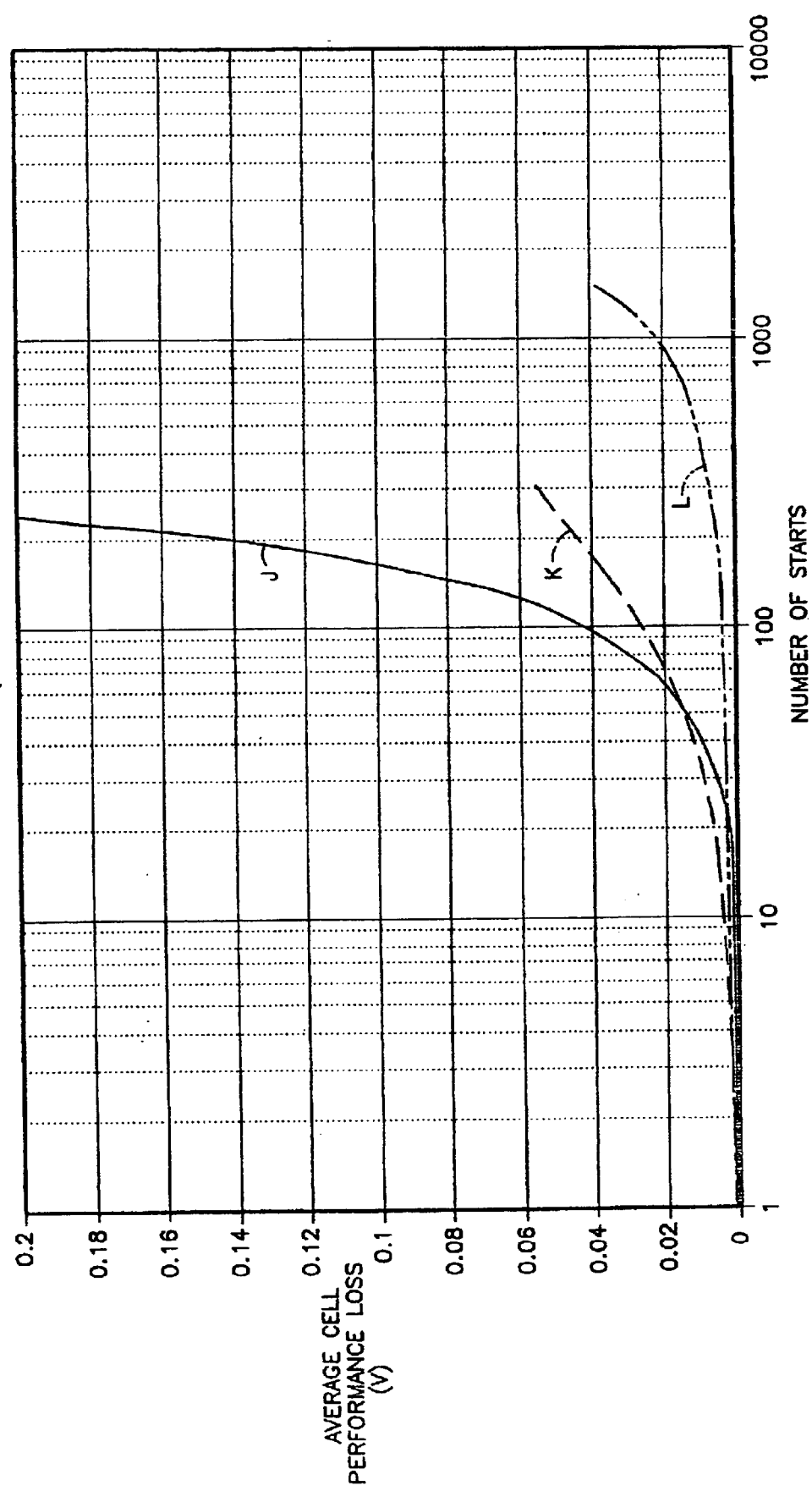
FIG. 3 is a graph showing the effect of the number of start-up/shut-down cycles on fuel cell performance using various start-up/shut-down procedures, including prior art procedures and the procedures of the present invention.

Compared to shutting down and starting up the fuel cell system by simply turning the fuel supply off and on with no purge or other performance decay limiting intervention (i.e. uncontrolled start/stop), the rapid air purge of fuel from the anode flow field at shut-down and the rapid hydrogen purge of air from the anode flow field upon start-up significantly increases cell life by reducing cumulative cell performance losses resulting from repeated shut-downs and start-ups. This is shown in the graph of FIG. 3. In FIG. 3, the vertical axis is average cell performance loss, in volts; and the horizontal axis is the number of cell start-ups. The curves J, K, and L represent data from the actual testing of 20 or 56 cell PEM cell stacks. The cells in the stack each included a membrane electrode assembly comprising a 15 micron thick perfluorosulfonic ionomer membrane having a platinum catalyst on the anode side and a platinum catalyst on the cathode side. The anode catalyst loading was 0.1 $mg/cm^2$, and the cathode catalyst loading was 0.4 $mg/cm^2$. The assembly was supplied by W. L. Gore Company of Elkton, Md. under the trade name PRIMEA 5560.

The curve J represents "uncontrolled" start-up and shut-down cycles. Over the course of the 250 or so cycles depicted by the curve, the start-up procedure was to initiate hydrogen flow into the air filled anode flow field at varying "uncontrolled" rates. A typical rate was one that was sufficient to produce a full anode flow field volume change in 10.0 seconds; however, the start-up flow rate for some cycles was as fast as 2.0 seconds and as slow as 28 seconds. The shut-down procedure simply consisted of turning off the fuel supply and letting the fuel dissipate by crossover of hydrogen and air through the electrolyte membranes.

The curve K represents controlled start-up and shut-down procedures, wherein the shut-down procedures were according to the present invention. Upon start-up, with the anode flow field filled with air, hydrogen flow was commenced at a rate sufficient to produce a full anode flow field volume change in 0.40 seconds. The shut-down procedure, starting with the anode flow field filled with hydrogen, displaced the hydrogen with air flowing at a rate sufficient to produce a full anode flow field volume change in 0.40 seconds.

The curve L represents controlled start-up and shut-down procedures like those used to produce curve K, except nitrogen was used instead of hydrogen to purge the air from the anode flow field upon start-up, before introducing hydrogen into the anode flow field; and nitrogen was used to displace the hydrogen upon shut-down, prior to introducing any air into the anode flow field. In both cases the nitrogen flow rate was sufficient to produce a full anode flow field volume change in 0.40 seconds. Curve L therefore represents the prior art nitrogen purging procedure discussed in the Background Information section of this specification. (Note that during the shut-down procedures represented by the curves J, K and L the auxiliary load switch 156 was open during the start-up procedure.)

Referring to FIG. 3, from curve J it can be seen that after approximately 250 "uncontrolled" cycles the average cell performance loss was about 0.195 volts. In comparison, as shown by curve K, using the shut-down procedure of the present invention along with an analogous start-up procedure, after 300 cycles the average cell performance loss was only 0.055 volts. That's less than 30% of the "uncontrolled" 250 cycle voltage loss, but with 20% more cycles. On the other hand, the prior art nitrogen purge technique resulted in only a 0.04 volts loss after about 1500 cycles.

By way of explanation, when nitrogen is used as the purge gas, there is generally a trace of oxygen in the nitrogen gas stream as a result of the nitrogen production process and/or as a result of oxygen crossover from the cathode flow field through the PEM membrane. That accounts for the small performance decay, with time, even when nitrogen is used. If the purge flow rate of nitrogen were increased, these losses would be reduced. The same is true for losses incurred using the procedures represented by curve K. Thus, if the purge flow rates represented by curve K are increased, the difference between curves K and L will decrease. It is estimated that curve K would closely approach or be insignificantly different from curve L if the curve K purge flow rates were increased to produce a full anode flow field volume change in 0.05 seconds or less. In that case, the present invention would provide all the benefits of a nitrogen purge without the complexity, cost and additional equipment volume necessitated by the use of nitrogen.

Although the invention has been described and illustrated with respect to the exemplary embodiments thereof, it should be understood by those skilled in the art that the foregoing and various other changes, omissions and additions may be made without departing from the spirit and scope of the invention.

What is claimed is:

1. A procedure for shutting down an operating fuel cell system, wherein, during operation of the fuel cell system, a continuous flow of air is being provided to a fuel cell cathode from an oxidant source through a cathode flow field on one side of an electrolyte, and a continuous flow of fresh hydrogen containing fuel is being provided to a fuel cell anode from a fuel source through an anode flow field on the other side of the electrolyte, and an electric current is being generated by the fuel cell within an external circuit and is operating a primary electricity using device in the external circuit, the procedure including the following steps:

(A) disconnecting the primary electricity using device from the external circuit and stopping the flow of fresh fuel from the fuel source to the anode flow field; and, then (B) displacing the fuel remaining within the anode flow field with air by blowing air into and through the anode flow field while venting the anode flow field exhaust; wherein throughout steps (A) and (B), any reactant gases in the anode flow field are able to readily reach the anode catalyst, and any reactant gases in the cathode flow field are able to readily reach the cathode catalyst.

2. The shut down procedure according to claim 1, wherein after disconnecting the primary electricity using device from the external circuit and before step (B), stopping the flow of air to the cathode flow field and connecting an auxiliary resistive load for a period of time across the anode and cathode in an external circuit to consume residual oxygen present within the cathode flow field.

3. The shut-down procedure according to claim 2, wherein the auxiliary load is applied until the voltage per cell is reduced to about 0.2 volt or less.

4. The shut-down procedure according to claim 3, wherein the flow of fresh fuel is stopped after the auxiliary load has been connected across the anode and cathode.

5. The shut-down procedure according to claim 2, wherein the auxiliary load is applied until the cell voltage is reduced by 0.1 volt or more prior to step (B).

6. The shut-down procedure according to claim 2, wherein the size of the applied auxiliary load is selected to reduce the voltage per cell to about 0.2 volts or less in less than 1.0 minute.

7. The shut-down procedure according to claim 2, wherein the auxiliary load continues to be applied during step B.

8. The shut-down procedure according to claim 1, wherein the step of displacing the fuel comprises moving a front of air through the anode flow field in less than 1.0 second.

9. The shut-down procedure according to claim 8, wherein the front of air moves through the anode flow field in less than 0.2 seconds.

10. The shut-down procedure according to claim 8, wherein the front of air moves through the anode flow field in less than 0.05 seconds.

11. The shut-down procedure according to claim 8, wherein the flow of air to the cathode flow field is stopped during the time the said front of air is moving through the anode flow field.

12. The shut-down procedure according to claim 2, wherein the step of displacing the fuel comprises moving a front of air through the anode flow field in less than 1.0 second.

13. The shut-down procedure according to claim 12, wherein the air front moves through the anode flow field in less than 0.2 seconds.

14. The shut-down procedure according to claim 12, wherein the air front moves through the anode flow field in less than 0.05 seconds.

15. The shut-down procedure according to claim 1, wherein, during normal fuel cell operation under load, a recycle blower within a recycle loop recirculates at least a portion of the anode flow field exhaust through the anode flow field; and wherein in step (B) the air is blown into and through the anode flow field using the recycle blower and without recirculating the anode exhaust.

16. The shut down procedure according to claim 15, wherein after step (A) and before step (B), connecting an auxiliary resistive load across the anode and cathode in an external circuit.

17. The shut-down procedure according to claim 16, wherein the step of displacing the fuel comprises moving a front of air through the anode flow field in less than 1.0 seconds.

18. The shut-down procedure according to claim 17, wherein the step of displacing the fuel comprises moving a front of air through the anode flow field in less than 0.2 seconds.

19. The shut-down procedure according to claim 18, wherein the step of displacing the fuel comprises moving a front of air through the anode flow field in less than 0.05 seconds.

20. The shut-down procedure according to claim 19, wherein the auxiliary load is applied until the cell voltage is reduced to about 0.2 volts or less.

21. The shut-down procedure according to claim 17, wherein the auxiliary load is applied until the cell voltage is reduced by at least 0.1 volt before step (B).

22. The shut-down procedure according to claim 20, wherein the auxiliary load continues to be applied during at least a portion of step (B).

23. The shut-down procedure according to claim 22, wherein the auxiliary load continues to be applied during at least a portion of step (B).

24. The shut-down procedure according to claim 20, wherein the auxiliary load continues to be applied during step B until all the fuel has been displaced.

25. A procedure for shutting down an operating fuel cell system, wherein, during operation of the fuel cell system, a continuous flow of air is being provided to a fuel cell cathode from an oxidant source through a cathode flow field on one side of an electrolyte, and a continuous flow of fresh hydrogen containing fuel is being provided to a fuel cell anode from a fuel source through an anode flow field on the other side of the electrolyte, and an electric current is being generated by the fuel cell within an external circuit and is operating a primary electricity using device in the external circuit, the procedure including the following steps:
(A) disconnecting the primary electricity using device from the external circuit and stopping the flow of air to the cathode flow field; and, then
(B) connecting an auxiliary resistive load for a period of time across the anode and cathode in an external circuit; and then
(C) displacing the fuel remaining within the anode flow field with air by blowing air into and through the anode flow field while venting the anode flow field exhaust; and
(D) prior to step (C), stopping the flow of fresh hydrogen containing fuel to the anode flow field.

26. The shut down procedure according to claim 25, wherein the flow of fresh hydrogen containing fuel to the anode flow field is stopped prior to step (B).

27. The shut-down procedure according to claim 25, wherein the auxiliary resistive load remains connected until the voltage per cell is 0.2 volt or less.

28. The shut down procedure according to claim 27, wherein in step (C) the remaining fuel is displaced in less than 1.0 minute.

29. The shut down procedure according to claim 27, wherein during the time the auxiliary resistive load is connected across the cell, a diode in series with the auxiliary load allows current flow through the auxiliary load only when the cell voltage is greater than 0.2 volt per cell.

30. The shut down procedure according to claim 2, wherein the fuel cells of the fuel cell system are PEM fuel cells.

31. The shut down procedure according to claim 25, wherein the fuel cells of the fuel cell system are PEM fuel cells.

32. The shut down procedure according to claim 27, wherein the fuel cells of the fuel cell system are PEM cells.

* * * * *